United States Patent [19]
Deuter

[11] 3,887,677
[45] June 3, 1975

[54] PROCESS OF MAKING A DYNAMOELECTRIC MACHINE STRUCTURE BY PRESSURE MOLDING

[75] Inventor: Thomas F. Deuter, Jonesboro, Ark.

[73] Assignee: General Electric Company, Fort Wayne, Ind.

[22] Filed: Sept. 20, 1973

[21] Appl. No.: 399,110

Related U.S. Application Data

[62] Division of Ser. No. 180,770, Sept. 15, 1971, Pat. No. 3,763,080.

[52] U.S. Cl. ............... 264/272; 264/329; 264/331
[51] Int. Cl. ...................... B29f 1/10; C08g 51/04
[58] Field of Search...264/272, 329, 331; 260/37 EP, 260/40 R

[56] References Cited
UNITED STATES PATENTS

| | | | |
|---|---|---|---|
| 3,041,562 | 6/1962 | Gammel, Sr. | 264/272 |
| 3,233,028 | 2/1966 | Toppari et al. | 264/272 |
| 3,493,531 | 2/1970 | Hofmann et al. | 264/272 |
| 3,587,168 | 6/1971 | Kolator | 264/272 |

Primary Examiner—Jeffery R. Thurlow
Attorney, Agent, or Firm—Ralph E. Krisher, Jr.

[57] ABSTRACT

Process of molding articles by pressure injection molding of compositions of matter comprising a mixture of a matrix former, a mass of particulate material with the particles of particulate material being generally uniformly scattered throughout the mixture, and a separation inhibitor also generally uniformly scattered throughout the mixture. The composition is moved through passages and orifices having a variety of configurations and into a mold cavity under pressure without relative separation between the particulate material and the remainder of the mixture. Also disclosed are articles that at least include a substantially rigid, nonporous structure pressure molded from such composition. These structures are a substantially rigid and solid agglomeration with the particulate material and separation inhibitor substantially uniformly scattered relative to solid matrix material. When the separation inhibitor is omitted from the mixture, and available pressure molding equipment and procedures are utilized in an attempt to flow such material through a mold cavity orifice and form pressure molded structures therefrom; relative separation between the particulate material and matrix former material occurs. Such separation would result in loss of structural integrity of the molded part and result, e.g., in brittleness, loss of structural stability, graininess, measurable porosity, loose particles of particulate material, and the like. On the other hand, articles molded by practicing the invention appear to be uniform and have generally uniform properties and structural characteristics from one portion thereof to another.

11 Claims, 12 Drawing Figures

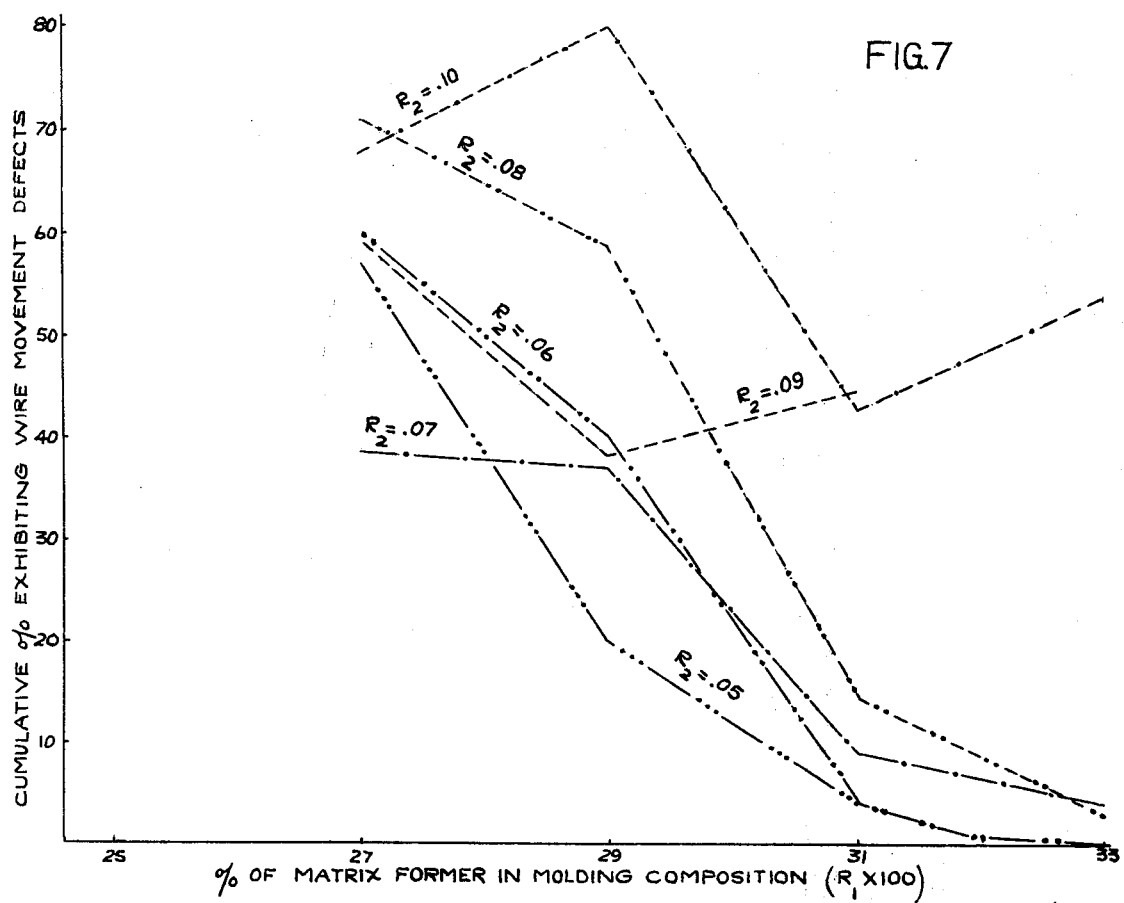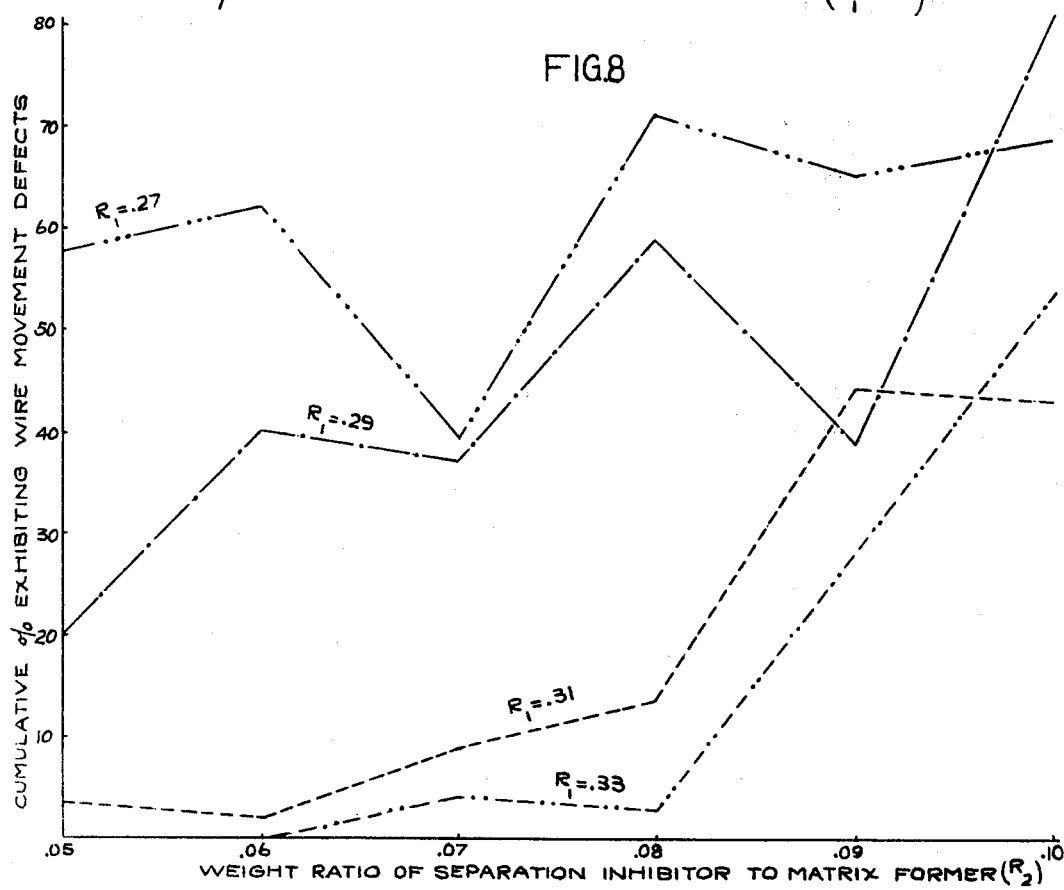

PROCESS OF MAKING A DYNAMOELECTRIC MACHINE STRUCTURE BY PRESSURE MOLDING

CROSS REFERENCE TO RELATED APPLICATIONS

This application is a division of my copending application Ser. No. 180,770, filed Sept. 15, 1971, now U.S. Pat. No. 3,763,080, issued Oct. 2, 1973, titled "Pressure Molded Articles and Composition." Copending application Ser. No. 215,751, filed Jan. 6, 1972 by Dochterman et al now U.S. Pat. No. 3,758,799 issued Sept. 11, 1973 and copending application Ser. No. 180,728 of Deuter et al, filed on Sept. 15, 1971 now U.S. Pat. No. 3,762,847, issued Oct. 2, 1973, and titled "Apparatus For Making A Molded Electrical Structure" are related applications. All of these applications are assigned to the assignee of this application and the disclosures of such applications are incorporated herein by reference.

BACKGROUND OF THE INVENTION

This invention relates generally to a process for pressure molding a dynamoelectric machine structure and more specifically, to a pressure molding process utilizing a pressure moldable molding composition comprising a mixture of a matrix former of a hardenable liquid type and a mass of particulate material. The mixture is movable through passages and orifices having varying configurations and into a mold cavity under pressure with the particles of particulate material remaining substantially uniformly dispersed, i.e., blended or scattered throughout the mixture, and substantially rigid and solid agglomerations are pressure molded with separate portions thereof substantially similar in material content and substantially similar with regard to structural characteristics.

Compositions comprising, among other things, matrix formers and particulate materials have been described as suitable for use as forming the housing means for a dynamoelectric machine.

Some compositions suitable for this purpose, among others, are disclosed in the above referenced U.S. Pat. No. 3,758,799 which describes, inter alia, a dynamoelectric machine including a substantially rigid mass of inert particulate material and hardened material, the substantially rigid mass being suitable for forming a protective enclosure for a core and coil assembly.

The Dochterman et al patent also describes methods of making such dynamoelectric machines as well as composite structures. In the practice of one of the Dochterman et al methods, a core and coil assembly is positioned in a mold cavity, particulate material is packed into the cavity around the core and coil assembly, and a hardenable liquid material is poured into the cavity to permeate the particulate material packed therein. In another approach, particulate and liquid materials are simultaneously packed around the core and coil assembly. The mold is then heated to harden the liquid material into a substantially rigid and solid matrix for the particulate material.

While the methods described and illustrated in the Dochterman et al patent have produced satisfactory structures and could be used on a mass production basis, it would nonetheless be desirable to devise still other methods having utility in the manufacture of dynamoelectric machines as well as other articles. Methods particularly useful in the manufacture of dynamoelectric machine composite structures are disclosed and claimed in the above-referenced U.S. Pat. No. 3,762,847.

By utilizing the teachings presented herein, structures of the type described in U.S. Pat. No. 3,758,799 and in U.S. Pat. No. 3,762,847 may be formed with relatively high speed molding techniques. By way of background, mixtures of particulare material and a matrix former of the hardenable resinous material type have been made using the proportions by weight of materials as taught in U.S. Pat. No. 3,758,799. Attempts then were made to force such mixture, under pressure, through a passageway and orifice into a mold cavity. However, relative spearation occurred between the matrix former and particulate material. In attempting to overcome this separation problem, the relative percentages of particulate and resinous materials were varied, but separation as well as other problems were still encountered when attempts were made to move the mixture through restricted passages under pressure.

Moreover, even when the particulate and resinous materials were thoroughly mixed and blended together and then stored in a container, the particulate material would tend to settle to the bottom of the container substantially immediately. This settling or separation was readily observable because a layer of relatively clear resinous material would appear on the top of the mixture within the container.

It will thus be understood that it would be very desirable to provide a new and improved process whereby a composition of matter including a matrix former and particulate material may be pressure molded and yet remain blended together while being forced to flow, under pressure, through restricted passageways such as, e.g., those encountered by molding materials flowing through pressure molding apparatus.

It will be understood that material used in pressure molding applications should be chemically unreactive relative to articles of manufacture exposed thereto during a molding process. Also such articles or parts thereof should not be dimensionally altered or damaged during such process. For example, the windings on a dynamoelectric machine core should not be moved or deformed when pressure molding a pressure moldable material thereagainst or therearound. It is even more desirable that the process result in pressure molded articles that are uniform in appearance and in structural characteristics from one part thereof to another.

In view of the above it should now be understood that it would be very desirable to provide a process for pressure molding compositions of matter with the constituent parts thereof uniformly blended together and wherein the uniformly blended characteristic or property is not deleteriously affected even when the composition is moved through restricted passageways under elevated pressures. The pressure molded articles produced by such process should include an agglomerate structure comprising a mass of particulate material particles of various sizes, with various sizes of particles tending to be uniformly distributed throughout the agglomerate structure. This results in an avoidance of different concentrations of particulate or matrix material in different portions of the agglomerate structure. In addition to being uniform in appearance, the thermal conductivity and other physical properties of the pressure molded articles desirably should be predictable with confidence, if not in fact controlled and enhanced throughout the agglomerate structure.

In view of the above, it will be understood that it would be very desirable to provide a pressure molding process that may be used to produce, at commercially acceptable rates, articles competitive with those manufactured by following the teachings of the above-referenced Dochterman et al U.S. Pat. No. 3,762,847.

SUMMARY OF THE INVENTION

Accordingly, it is an object of the present invention to provide an improved process for use in pressure molding an improved structure around at least part of a dynamoelectric machine assembly.

Another object of the present invention is to provide an improved pressure molding process which utilizes a mixture of a matrix former and particulate material which remains blended while being forced to flow through pressure molding apparatus passageways.

Still another object of the present invention is to provide a pressure molding process which is useful at commercially acceptable rates to produce commercially competitive articles having a structural portion thereof formed from a mixture of a matrix former and particulate material.

In carrying out the objects of the invention in one form, I provide a process for producing a pressure molded structure from a blended composition of matter comprising a mixture of a matrix former or binder forming material in a flowable form; particulate material; and a separation inhibitor in an effective amount to permit the mixture to be moved under pressure through passages and into a mold cavity in a blended condition, i.e., without relative separation between the particulate material and the remainder of the mixture. In preferred forms, the separation inhibitor is a finely divided solid material and both the particulate and the separation inhibitor materials are generally uniformly scattered or blended throughout the mixture. A preferred method of manufacturing the composition comprises the steps, when the flowable matrix former material is liquid in form and the separation inhibitor is a finely divided solid, of wetting the separation inhibitor with the matrix former; blending the separation inhibitor with the matrix former adding the particulate material to the matrix former and separation inhibitor mixture; and blending the particulate material with the matrix former and separation inhibitor mixture. Thereafter, the composition is injected, under pressure, into mold cavity means to form articles that at least include a pressure molded, substantially rigid and solid agglomeration; the agglomeration forming a substantially rigid, nonporous pressure molded structure with the separation inhibitor and the particulate material generally uniformly distributed throughout a matrix formed by the matrix former.

The subject matter which I regard as my invention is set forth in the appended claims. The invention itself, however, together with further objects and advantages thereof may be better understood by referring to the following more detailed description taken in conjunction with the drawings.

BRIEF DESCRIPTION OF THE DRAWINGS

FIGS. 1 through 8 are graphic representations, in the form of families of curves, of data collected and utilized in determining preferred proportions of ingredients for a composition of matter that may be used to particular invention in carrying out processes embodying the invention in one form;

FIG. 1 shows plots of percent of articles without defects versus percent by weight of matrix former, different curves being shown for different amounts of separation inhibitor added to the matrix former;

FIG. 2 is a plot of curves based on the same data as the curves of FIG. 1 but wherein the "percent without defects" is plotted versus the weight ratio of separation inhibitor to matrix former; in FIG. 2, separate curves are plotted for different ratios of matrix former weight to molding composition weight;

FIGS. 3 and 4 are plots of curves that differ, respectively, from FIGS. 1 and 2 in that FIGS. 3 and 4 illustrate the cumulative percent of articles exhibiting defects associated with incomplete mold cavity filling (lack of fill) and/or separation, this criteria being referred to as "separation/fill";

FIGS. 5 and 6 are plots of curves that differ from FIGS. 3 and 4, respectively, in that FIGS. 5 and 6 illustrate the cumulative percent of articles observed to exhibit defects associated with "cracking", including articles with defects other than cracking;

FIGS. 7 and 8 are plots of curves that differ from FIGS. 3 and 4, respectively, in that FIGS. 7 and 8 illustrate the cumulative percent of articles observed to exhibit defects associated with "wire movement", including articles with defects other than wire movement defects;

DESCRIPTION OF PREFERRED EMBODIMENTS

Figure 1:
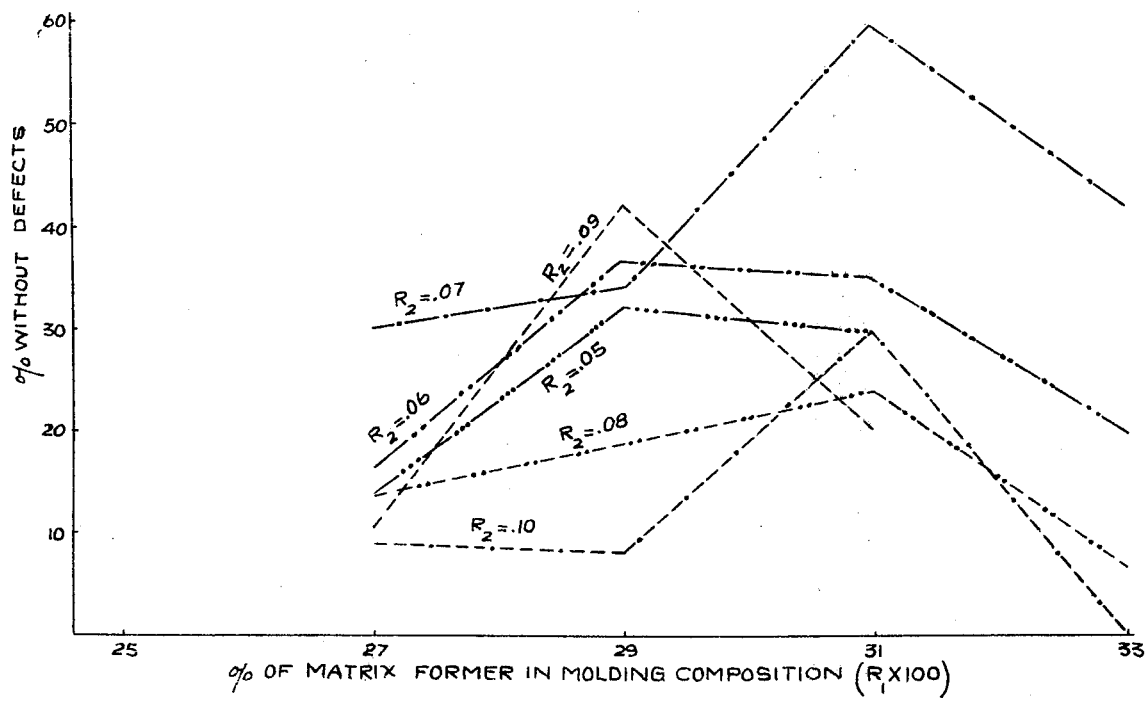
Figure 2:
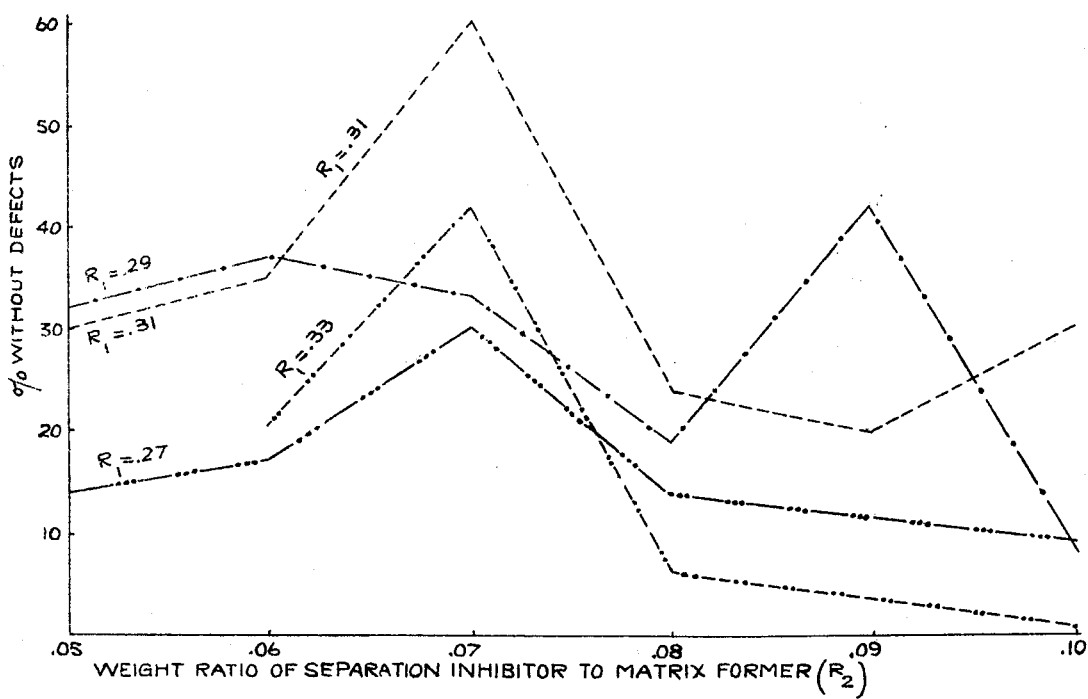

A preferred method embodying the present invention can advantageously be utilized with pressure molding apparatus and in conjunction with methods such as those disclosed in the above-referenced U.S. pat. No. 3,762,847 to form substantially rigid, solid and nonporous agglomerate structures wherein the various components of such compositions are substantially uniformly scattered or blended throughout the molded structures. Terms such as "pressure mold", pressure molding and pressure molded ae used herein as descriptive of molding equipment, processes, and products thereof in which a molding composition is moved into a mold cavity by subjecting a quantity of the composition to a pressure differential. The molding composition is then hardened and/or at least partially cured. These pressure terms are thus also descriptive of conventional molding approaches commonly termed injection, transfer, and vacuum molding and are also intended to include other molding techniques which will be apparent to persons skilled in the art.

While the apparatus disclosed and claimed in U.S. Pat. No. 3,762,847 are referred to herein for purposes of illustration, the present invention is not limited to use with that particular apparatus. On the contrary, other types of apparatus and procedures may be utilized in conjunction with methods embodying the present invention.

Molding compositions utilized in the practice of the present invention in a preferred form comprise a blended mixture of a particulate material; a binder forming material, i.e., a material that will form a substantially solid matrix for the particulate material (thus, a "matrix former"); and a separation inhibitor, i.e., separation inhibiting means that prevent relative separation of the various materials in the blended mixture.

MATRIX FORMER

It is preferred that the matrix former be a flowable material and, preferably, be liquid in form. In preferred compositions, this liquid is hardenable into a substantially solid matrix. The molding compositions of the invention may also include, if desired, a catalyst for controlling the rate of solidification or hardening of the matrix, a pigment or pigments for coloring the molding composition, and/or a mold release agent to facilitate removal of agglomerate structures from untreated mold surfaces when desired.

The matrix forming material can, for example, be one of many different liquids which, after being appropriately mixed or blended with the chosen particulate material, will harden and secure the particulate material together as a tightly knit agglomeration with the desired degree of structural integrity and the desired physical properties of the molded product. Different hardenable liquids have and can be used as a matrix former in different embodiments of the invention.

Presented below is a list of "Exemplary Resins". This list presents commercial designations and sources for types of materials that are set out in the Dochterman et al application and are here presented as exemplary of the type of materials that may be suitable matrix formers. As will be more thoroughly described hereinafter, some of the following materials would normally be used as substantially the only liquid material in a composition while it would be preferable that selected other ones of the listed materials be used in combination with one or more of other selected ones of the below listed materials. For example, it is preferred that styrene or vinyl toluene be used in combination with a material that will copolymerize therewith, e.g., a polyester resin. The source and designation of the listed materials are presented for the sake of completeness of disclosure, and it is to be understood that other commercially available materials may be substituted for those specifically designated.

EXEMPLARY RESINS 1. polyester resin - for example, "519-C-111" of Conchemco, Inc. 1401 Severn Street, Baltimore, Maryland, a casting compound comprising monobasic and poly-basic acids and polyhydric alcohols.
2. styrene resin - for example, "D5D50B" of Hoosier Solvents & Chemical Company, New Haven, Indiana 3.
3. vinyltoluene resin - for example, "vinyltoluene" of Conchemco, Inc. of Baltimore, Maryland
4. epoxy resins identified and sold, for example, as: Epon 812, Epon 815, Epon 871 by Shell Chemical Company; Araldite EPN1139, Araldite CY178, Araldite ERE1359 by Ciba-Geigy Corp.; ED5661 by Celanese Coatings Co.; and STF-5 by Reichold Chemical, Inc.
5. phenolic resin - for example, Varcum 8121 of Reichold Chemical, Inc.
6. polybutadiene resin - for example, Ricon 100 of Richardson Co.
7. epoxy-acrylic resin - for example, Epocryl E-11 of the Shell Chemical Company
8. epoxy-polyester "alloys" - for example, Oxiron 2000 of Food Machinery and Chemical Corp.

The listing of various types of materials above is presented for purposes of completeness of description and not for purposes of limitation. Other matrix former materials could also be useful while practicing of the invention. Also, while the above listed materials will harden during exposure to elevated temperatures, materials which harden upon being exposed to radiation, or other controllable hardening conditions, are also believed to be useful.

PARTICULATE MATERIAL

Particulate material to be blended with the selected matrix former may be any one of a number of different materials selected to be compatible with the selected matrix former. The particulate material is selected to be chemically unreactive with the selected matrix former whether using one or more of the above listed resins or another selected material. Mineral particulate materials that are specifically mentioned in the above-referenced Dochterman et al application include chromite ore; slate; chalk; zirconia; alumina; calcium carbonate; mica; beryllium oxide; magnesium oxide; sand (e.g., silica or zircon sand); and combinations thereof. In addition, I believe that other materials that are chemically unreactive with the matrix former could also be used.

However, for purposes of exemplification, the following discussion of particulate material will be restricted to silica sand taken from the Wolf River Deposit, Memphis, Tennessee and also described in the referenced Dochterman et al U.S. Pat. No. 3,758,799. While specific samples of this sand are analyzed and described in the Dochterman et al patent, silica sand from the Wolf River Deposit that is shipped in bulk form by the truckload generally has a particle size distribution falling within the following ranges of U.S. standard sieve sizes:

| No. U.S. Sieve Size | % Passing |
| --- | --- |
| 30 | 95 – 100 |
| 50 | 57 – 80 |
| 100 | 5 – 15 |
| 200 | 0 – 5 |

This material, as mined from the river bed deposit and delivered, usually has an A.F.S. particle size range of from 45–55 and a moisture content of from about 9 to 15 percent. For most consistent results when using this material, it is preferable to process it through any commercially available sand dryer and sift the sand with a U.S. 30 mesh screen to remove foreign objects that might be present. After this processing, I have found that Wolf River sand with a moisture content of from about 0.3 to 1.0 percent is useable with consistent results in the fabrication of articles embodying the invention.

For completeness of description, analysis of the Wolf River sand has shown it to have a content of about 92 percent by weight silica, 8 percent or less by weight metallic oxides other than copper, and about 2 percent or less by weight clay, there being substantially no copper compounds or metallic salts therein.

Wolf River sand is described as a subangular, whole grain sand but the shape of the particulate material actually selected may vary. Furthermore, the particle size and particle size distribution may vary and the previously stated particle size distribution is not to be considered as limiting.

Another source of silica sand that has been used is the beach of Lake Michigan and this material may be purchased in bulk form as "20KK sand" from Manley Sand, a Division of Martin-Marrietta Corporation, Bridgemont, Michigan.

When the molding composition is intended for use in encapsulating electrical apparatus, a particulate material which is nonmagnetic and electrically nonconductive is preferred. Thus, a material low in copper compound and metallic salt content should be selected. Similarly, hardenable liquids are preferred as matrix formers for this end use which, when hardened, have all of the electrical properties of good electrical insulation. As will be understood, particulate materials and liquids having other properties and characteristics may be selected for other product applications.

SEPARATION INHIBITOR

Different types of materials are useful as the separation inhibiting constituent in molding compositions that are to be pressure molded in accordance with the present invention. Separation inhibiting materials that have been satisfactorily used have been much smaller in size than the particulate material above described.

For example, one suitable material useful as a separation inhibiting means is collodial silica, generally classified as a "fumed silica". One commercialy available material of this type is CAB-O-SIL M-5 fumed silica, as sold by the Cabot Corporation, 125 High Street, Boston, Massachusetts. According to published literature of the Cabot Corporation, this material has a particle size of about 0.012 micron, and 99.98 percent by weight thereof passes a U.S. No. 325 sieve. Other materials suitable for use as a separation inhibiting means are Aerosol Grade 200 powdered silica, as sold by DeGussa Corporation, New York, New York, and Grade 244 powdered asbestos, as sold by Chemical and Plastics Division, Union Carbide Corporation, New York, New York. The Aerosol Grade 200 silica is quite similar in size and properties to the M-5 CAB-O-SIL silica, while the powdered asbestos is comprised primarily of short fibers or needles having a length on the order of about 200 times the fiber diameter, the diameter being about 0.025 microns (on the average).

As is known, asbestos may be generally described as an amphibole mineral comprising chiefly metasilicates of calcium and magnesium. Still other materials that would be expected to be useful as separation inhibiting means would be extremely short glass fibers, or material such as a powdered form of the mineral wollastonite. As is known, wollastonite is composed primarily of calcium metasilicate ($CaO.SiO_3$) in needlelike crystal form and is readily crushed and ground to form a fibrous powder with about 99.5 percent by weight thereof passing a 325 mesh screen.

In addition to being of a very fine particle size fibrous or nonfibrous powder, the separation inhibiting material selected is preferably insoluble in the selected matrix former and is chemically unreactive in a mixture of particulate material and matrix former. Since both fibrous and nonfibrous powdery separation inhibiting means have provided satisfactory results, the shape of the particular material selected does not appear to be critical. Furthermore, although the CAB-O-SIL and Aerosol silica powders are substantially pure silica (e.g. 99 percent silicon dioxide), other useful materials, including mineral ores, are not. However, all of the preferred separation inhibiting materials are generally classifiable as inorganic materials. One useful guideline for selecting a separation inhibitor for a molding composition intended to be used for encapsulating electrical apparatus is that the separation inhibitor be nonmagnetic and electrically nonconductive. All of the specifically above-mentioned materials are of this type.

BLENDED MIXTURE

Pressure molding compositions, useful in processes embodying the invention, are a blended or thoroughly mixed combination of a matrix former; relatively course particulate material; and a separation inhibitor, as above disclosed. These ingredients along with optional ingredients such as pigments to color the composition; catalysts; mold release agents; and so forth are thoroughly mixed or blended together as will now be described in connection with a preferred form of practicing the invention.

When more than one liquid matrix former ingredient is used, e.g., polyester and styrene, I have found that more consistent results will be obtained by first mixing the liquids together and, preferably, by first charging the more viscous liquid into a mixer or mixing chamber and then mixing the less viscous liquid or liquids into the liquid already in the mixing chamber.

When catalysts and/or color adding materials, such as pigment, are used, such optional ingredients are preferably added after or concurrently with the less viscous liquid or liquids. All of these ingredients are thoroughly mixed in the mixing chamber.

The separation inhibitor is then added to the liquid mixture as the penultimate ingredient. Since the separation inhibitor is very fine in form and may be literally blown away like dust, the mixer is shut off prior to adding the separation inhibitor when the mixing chamber is open to the atmosphere and the dry inhibitor could be blown away. The separation inhibitor is then thoroughly wetted with liquid and thoroughly mixed into the liquid matrix former. The mixture of all ingredients thus forms a mixture that will be referred to hereafter as the matrix forming mixture.

The mixture at this time should be relatively viscous. For example, acceptable agglomerate structures have been made from different batches of compositions wherein the different matrix forming mixtures had a viscosity, for example, in the range of from about $0.2 \times 10^5$ to $6.9 \times 10^5$ centipoises at 17°C as determined by utilizing a Brookfield viscometer (HAT model with helipath stand, using a T-D spindle at 2.5 r.p.m.). The above and all other viscosity measurements or viscosities described herein are measured at 17°C utilizing the same model of Brookfield viscometer in accordance with the following procedure unless specifically noted otherwise. Before the measurement is taken, both the helipath stand and the viscometer on the stand are leveled. A spindle is chosen such that the initial reading is about 50 percent of the full scale deflection of the viscometer. Viscosity measurements recorded herein were made with a T-D spindle at 2.5 r.p.m. The spindle is set such that the cross piece is covered by about ¼ inch of the sample whose viscosity is to be measured. The viscometer is started and the dial is allowed to make two revolutions before turning on the helipath stand. The helipath stand is started and the third revolution reading is recorded. Three independent viscosity tests are made, and the temperature at which the measurement is made is also recorded. The readings of the 0–100 scale on the dial are multiplied by factors from a printed table used with the Brookfield viscometer as will be understood.

After the matrix forming mixture has been blended toogether, the particulate material is added to the matrix forming mixture while the mixture is being agitated, preferably by gradually adding the particulate material to the mixing chamber. After all of the particulate material has been added to the mixing chamber, the resulting composition is mixed for a period of time to insure thorough mixing or blending of the materials.

When well mixed, both the particulate material and the separation inhibitor are generally uniformly scattered throughout the remainder of the composition. I have found that compositions so formed may be stored for long periods of time in environments which do not tend to harden the matrix former without any noticeable separation between the particulate material and the remainder of the composition. The storage environment for such compositions may, of course, vary. The preferred environment may depend, for example, on whether materials utilized are thermo-setting or radiation hardenable.

The composition of matter, after it has been completely formulated, is also relatively viscous, and acceptable agglomerate structures have been made from different compositions with viscosities ranging from about $2.5 \times 10^5$ to $61 \times 10^5$ centipoises.

Disclosures made herein concerning viscosities are for the sake of completeness, and it should be specifically noted that relatively wide viscosity ranges may occur from one material batch to another even though both are the same nominal composition. For example, one batch of material comprising about 69 percent by weight Wolf River sand, 2.4 percent by weight M-5 CAB-O-SIL silica, 15.7 percent by weight polyester resin, and 12.9 percent by weight styrene had a viscosity of about $7.1 \times 10^5$ centipoises. Another batch of the same nominal composition but made at a later time, had a viscosity of about $13.2 \times 10^5$ centipoises. Acceptable agglomerate structures were made, however, from both batches with a single cavity pressure molding apparatus as illustrated in the above referenced U.S. Pat. No. 3,762,847. Each of the molding compositions just described were movble through the filler tubes and into the mold cavity of the single cavity pressure molding apparatus at pressures ranging from about 40 to about 150 pounds per square inch staisfactorily without relative concentration or separation of the particulate material and other components of the composition.

The following Table I presents, in tabular form, relative proportions of various materials that could be considered for use in preparing compositions exemplifying my invention. For ease of comparison, different formulations are listed and identified as Examples 1–62 in the Table. The percentages of the various materials for each composition would be the percentage, by weight, of the component listed at the head of the various columns.

TABLE I

| EX. | A. | B. | C. | D. | E. | F. | G. | H. | I. | J. | K. | L. | M. | N. | O. | P. | Q. | R. | Total |
|---|---|---|---|---|---|---|---|---|---|---|---|---|---|---|---|---|---|---|---|
| 1 | 25.6 | | | | | | 1.3 | | | 73.1 | | | | | | | | | 100.0 |
| 2 | 14.1 | 11.5 | | | | | | 1.3 | | | 73.1 | | | | | | | | 100.0 |
| 3 | | | 25.6 | | | | | 1.3 | | | | 73.1 | | | | | | | 100.0 |
| 4 | | | | 25.6 | | | 0.5 | 0.4 | 0.4 | | | | 73.1 | | | | | | 100.0 |
| 5 | | | | | 25.6 | | 0.5 | 0.4 | 0.4 | | | | | 73.1 | | | | | 100.0 |
| 6 | | | | | | 25.6 | 0.5 | 0.4 | 0.4 | | | | | | 73.1 | | | | 100.0 |
| 7 | | | | | | 25.6 | | 1.3 | | | | | | | | 73.1 | | | 100.0 |
| 8 | | | | | 25.6 | | | 1.3 | | | | | | | | | 73.1 | | 100.0 |
| 9 | | | | 25.6 | | | 1.3 | | | | | | | | | | | 73.1 | 100.0 |
| 10 | | | 25.6 | | | | 0.4 | 0.4 | 0.4 | 9.2 | 8.0 | 8.0 | 8.0 | 8.0 | 8.0 | 8.0 | 8.0 | 8.0 | 100.0 |
| 11 | 14.1 | 11.5 | | | | | 0.4 | 0.4 | 0.4 | 9.2 | 8.0 | 8.0 | 8.0 | 8.0 | 8.0 | 8.0 | 8.0 | 8.0 | 100.0 |
| 12 | 25.6 | | | | | | 0.4 | 0.4 | 0.4 | 9.2 | 8.0 | 8.0 | 8.0 | 8.0 | 8.0 | 8.0 | 8.0 | 8.0 | 100.0 |
| 13 | 29.8 | | | | | | | 2.1 | | | 68.1 | | | | | | | | 100.0 |
| 14 | 16.4 | 13.4 | | | | | | 2.1 | | | | 68.1 | | | | | | | 100.0 |
| 15 | | | 29.8 | | | | | 1.5 | 0.6 | | | | 68.1 | | | | | | 100.0 |
| 16 | | | | 29.6 | | | 0.7 | 0.7 | 0.7 | | | | | 68.1 | | | | | 100.0 |
| 17 | | | | | 29.8 | | 0.7 | 0.7 | 0.7 | | | | | | 68.1 | | | | 100.0 |
| 18 | | | | | | 29.8 | 0.7 | 0.7 | 0.7 | | | | | | | 68.1 | | | 100.0 |
| 19 | | | | | | 29.8 | | 1.5 | 0.6 | | | | | | | | 68.1 | | 100.0 |
| 20 | | | | | 29.8 | | | 2.1 | | | | | | | | | 68.1 | | 100.0 |
| 21 | | | | 29.8 | | | | 2.1 | | | | | | | | | | 68.1 | 00.0 |
| 22 | | | 29.8 | | | | | 0.7 | 0.7 | 0.7 | 11.9 | 7.1 | 7.1 | 7.1 | 7.0 | 7.0 | 7.0 | 7.0 | 7.0 | 100.0 |
| 23 | 16.4 | 13.4 | | | | | | 0.7 | 0.7 | 0.7 | 11.9 | 7.1 | 7.1 | 7.1 | 7.0 | 7.0 | 7.0 | 7.0 | 7.0 | 100.0 |
| 24 | 29.7 | | | | | | | 0.7 | 0.7 | 0.7 | 11.9 | 7.1 | 7.1 | 7.1 | 7.0 | 7.0 | 7.0 | 7.0 | 7.0 | 100.0 |
| 25 | 34.6 | | | | | | | 3.5 | | | 61.9 | | | | | | | | 100.0 |
| 26 | 19.1 | 15.5 | | | | | | 3.5 | | | | 61.9 | | | | | | | 100.0 |
| 27 | | | 34.6 | | | | | 1.7 | 1.8 | | | | 61.9 | | | | | | 100.0 |
| 28 | | | | 34.6 | | | 1.3 | 1.1 | 1.1 | | | | | 61.9 | | | | | 100.0 |
| 29 | | | | | 34.6 | | 1.3 | 1.1 | 1.1 | | | | | | 61.9 | | | | 100.0 |
| 30 | | | | | | 34.6 | 1.3 | 1.1 | 1.1 | | | | | | | 61.9 | | | 100.0 |
| 31 | | | | | | 34.6 | | 1.7 | 1.8 | | | | | | | | 61.9 | | 100.0 |
| 32 | | | | | 34.6 | | | 3.5 | | | | | | | | | 61.9 | | 100.0 |
| 33 | | | | 34.6 | | | | 3.5 | | | | | | | | | | 61.9 | 100.0 |
| 34 | | | 34.6 | | | | | 1.1 | 1.3 | 1.1 | 7.0 | 7.0 | 7.0 | 7.0 | 7.0 | 7.0 | 7.0 | 7.0 | 5.9 | 100.0 |
| 35 | 19.1 | 15.5 | | | | | | 1.1 | 1.3 | 1.1 | 7.0 | 7.0 | 7.0 | 7.0 | 7.0 | 7.0 | 7.0 | 7.0 | 5.9 | 100.0 |
| 36 | 34.6 | | | | | | | 1.1 | 1.3 | 1.1 | 7.0 | 7.0 | 7.0 | 7.0 | 7.0 | 7.0 | 7.0 | 7.0 | 5.9 | 100.0 |
| 37 | 25.8 | | | | | | | 2.6 | | | 71.6 | | | | | | | | 100.0 |

TABLE I — Continued

| EX. | A. | B. | C. | D. | E. | F. | G. | H. | I. | J. | K. | L. | M. | N. | O. | P. | Q. | R. | Total |
|---|---|---|---|---|---|---|---|---|---|---|---|---|---|---|---|---|---|---|---|
| 38 | 14.2 | 11.6 | | | | | | 2.6 | | | 71.6 | | | | | | | | 100.0 |
| 39 | | | 25.8 | | | | | 1.3 | 1.3 | | | 71.6 | | | | | | | 100.0 |
| 40 | | | | 25.8 | | | 0.9 | 0.8 | | | | | 71.6 | | | | | | 100.0 |
| 41 | | | | | 25.8 | | 0.9 | 0.9 | 0.8 | | | | | 71.6 | | | | | 100.0 |
| 42 | | | | | | 25.8 | 0.9 | 0.9 | 0.8 | | | | | | 71.6 | | | | 100.0 |
| 43 | | | | | | 25.8 | | 1.3 | 1.3 | | | | | | | 71.6 | | | 100.0 |
| 44 | | | | | 25.8 | | | 2.6 | | | | | | | | | 71.6 | | 100.0 |
| 45 | | | | 25.8 | | | 2.6 | | | | | | | | | | | 71.6 | 100.0 |
| 46 | | | 25.8 | | | | 0.9 | 0.8 | 8.0 | 8.0 | 8.0 | 8.0 | 8.0 | 8.0 | 8.0 | 8.0 | 8.0 | 7.6 | 100.0 |
| 47 | 14.2 | 11.6 | | | | | 0.9 | 0.9 | 0.8 | 8.0 | 8.0 | 8.0 | 8.0 | 8.0 | 8.0 | 8.0 | 8.0 | 7.6 | 100.0 |
| 48 | 25.8 | | | | | | 0.9 | 0.9 | 0.8 | 8.0 | 8.0 | 8.0 | 8.0 | 8.0 | 8.0 | 8.0 | 8.0 | 7.6 | 100.0 |
| 49 | 34.6 | | | | | | 1.8 | | | 63.6 | | | | | | | | | 100.0 |
| 19.1 | 15.5 | | | | | | 1.8 | | | 63.6 | | | | | | | | 00.0 | |
| 51 | | | 34.6 | | | | | 1.8 | | | | 63.6 | | | | | | | 100.0 |
| 52 | | | | 34.6 | | | 0.9 | 0.9 | | | | | 63.6 | | | | | | 100.0 |
| 53 | | | | | 34.6 | | 0.9 | 0.9 | | | | | | 63.6 | | | | | 100.0 |
| 54 | | | | | | 34.6 | 0.9 | 0.9 | | | | | | | 63.6 | | | | 100.0 |
| 55 | | | | | | 34.6 | | 1.8 | | | | | | | | 63.6 | | | 100.0 |
| 56 | | | | | 34.6 | | | 1.8 | | | | | | | | | 63.6 | | 100.0 |
| 57 | | | | 34.6 | | | 1.8 | | | | | | | | | | | 63.6 | 100.0 |
| 58 | | | 34.6 | | | | 0.9 | 0.9 | | 7.1 | 7.1 | 7.1 | 7.1 | 7.1 | 7.1 | 7.0 | 7.0 | 7.0 | 100.0 |
| 59 | 19.1 | 15.5 | | | | | 0.9 | 0.9 | | 7.1 | 7.1 | 7.1 | 7.1 | 7.1 | 7.1 | 7.0 | 7.0 | 7.0 | 100.0 |
| 60 | 34.6 | | | | | | 0.9 | 0.9 | | 7.1 | 7.1 | 7.1 | 7.1 | 7.1 | 7.1 | 7.0 | 7.0 | 7.0 | 100.0 |
| 61 | 19.5 | | 15.1 | | | | 0.9 | 0.9 | | 7.1 | 7.1 | 7.1 | 7.1 | 7.1 | 7.1 | 7.0 | 7.0 | 7.0 | 100.0 |
| 62 | | | 19.5 | | | 15.1 | 0.9 | 0.9 | | 7.1 | 7.1 | 7.1 | 7.1 | 7.1 | 7.1 | 7.0 | 7.0 | 7.0 | 100.0 |

The following (A – R) are measured in % weight:
A. polyester
B. styrene
C. epoxy
D. phenolic
E. polybutadiene
F. acrylic
G. silica powder
H. asbestos powder
I. wollastonite powder
J. silica sand
K. slate
L. chalk
M. zirconia
N. alumina
O. calcium carbonate
P. mica
Q. beryllium oxide
R. magnesium oxide Examples 1 through 62 in Table I above are presented to illustrate various molding compositions comprising different matrix formers, particulate materials, and separation inhibitors. In the Table I examples, the matrix former varies from about 26 percent by weight to about 35 percent by weight of the molding composition while the particulate material varies from about 60 percent by weight to about 75 percent by weight of the composition. The separation inhibitor varies from about 5 percent weight to about 10 percent weight of the matrix former. While most of the Examples 1 through 62 include a single liquid material as the matrix former component, combinations of matrix forming materials are also contemplated. Examples 2, 11, 14, 23, 26, and 35, among others, would include more than one matrix forming material.

Examples 1 through 62 also suggest the use of combinations of different particulate materials and different separation inhibitors in a molding composition formulation. As will be understood, however, the various selected materials are to be compatible with one another in the blended mixture in actual practice. Moreover, the amount of separation inhibitor actually used may be varied and preferred amounts thereof for a particular blended mixture may be determined in a manner to be explained hereinafter in connection with FIGS. 1 through 8. The inhibitor is, for the reasons set forth above, used in an amount to prevent separation of the particulate material from the balance of the blended mixture, i.e., maintain all of the ingredients blended in the mixture.

Other examples of compositions are disclosed by the following Table II:

TABLE II

| Ex. | A. | B. | C. | D. | E. | F. | G. | H. | I. | J. | K. | L. | M. |
|---|---|---|---|---|---|---|---|---|---|---|---|---|---|
| 63 | 29 | 2.03 | 68.98 | 1.04 | 35 | 20 | 6 | 6 | — | — | 3 | 31 | 34 |
| 64 | 27 | 1.89 | 71.12 | 1.22 | 33 | 12 | 15 | 21 | — | 3 | 3 | 15 | 30 |
| 65 | 31 | 2.17 | 66.84 | .928 | 35 | 6 | — | — | — | 3 | 24 | 6 | 60 |
| 66 | 33 | 2.31 | 64.70 | .672 | 27 | 46 | — | 4 | — | — | 8 | — | 42 |
| 67 | 29 | 1.74 | 69.27 | 1.01 | 25 | 4 | — | 16 | — | 4 | 4 | 28 | 44 |
| 68 | 27 | 1.62 | 71.39 | 1.06 | 24 | 8 | 12 | 29 | 8 | 4 | — | 21 | 17 |
| 69 | 29 | 1.74 | 69.27 | .80 | 37 | 5 | 8 | 3 | 3 | 11 | 27 | 14 | 30 |
| 70 | 31 | 1.86 | 67.15 | .912 | 27 | 19 | 4 | — | — | 4 | 45 | — | 30 |
| 71 | 31 | 1.86 | 67.15 | .640 | 31 | 10 | 3 | — | — | — | 48 | — | 39 |
| 72 | 33 | 1.98 | 65.1 | .560 | 25 | 32 | 8 | — | — | — | 40 | — | 20 |
| 73 | 29 | 1.45 | 69.56 | .646 | 25 | 16 | 20 | 8 | — | — | 12 | 12 | 32 |
| 74 | 27 | 1.35 | 71.66 | .752 | 29 | 21 | 3 | 17 | 17 | 10 | 3 | 14 | 14 |
| 75 | 29 | 2.32 | 68.69 | 3.12 | 27 | 4 | 19 | 11 | 7 | 22 | 7 | 19 | 19 |
| 76 | 31 | 1.55 | 67.46 | .512 | 24 | 12 | — | 4 | — | — | 50 | — | 30 |

TABLE II—Continued

| Ex. | A. | B. | C. | D. | E. | F. | G. | H. | I. | J. | K. | L. | M. |
|---|---|---|---|---|---|---|---|---|---|---|---|---|---|
| 77 | 27 | 2.16 | 70.85 | 3.3 | 43 | 14 | — | 37 | — | — | 2 | 33 | 14 |
| 78 | 31 | 2.48 | 66.53 | 1.32 | 29 | 38 | 7 | 7 | — | — | 17 | 7 | 24 |
| 79 | 33 | 2.64 | 64.37 | 1.09 | 29 | 65 | 21 | 3 | — | — | 3 | — | 7 |
| 80 | 29 | 2.61 | 68.40 | 3.06 | 21 | 19 | — | 5 | — | 5 | — | 29 | 43 |
| 81 | 31 | 2.79 | 66.22 | 2.23 | 25 | 24 | 8 | 20 | 8 | — | 4 | 16 | 20 |
| 82 | 27 | 2.43 | 70.58 | 4.80 | 26 | 23 | — | 42 | — | — | — | 23 | 11 |
| 83 | 31 | 3.10 | 65.91 | 3.55 | 26 | 15 | 12 | 8 | — | 12 | — | 23 | 30 |
| 84 | 29 | 2.90 | 68.11 | 4.05 | 25 | 12 | — | 12 | — | — | — | 68 | 8 |
| 85 | 27 | 2.70 | 70.31 | 6.08 | 22 | 23 | — | 36 | — | — | — | 32 | 9 |
| 86 | 33 | 3.30 | 63.71 | 3.28 | 24 | 42 | — | 37 | — | 4 | 4 | 12 | — |

Figure 11:
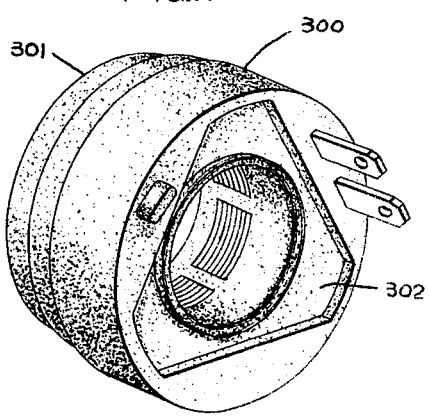
FIG. 11 is a perspective view of an article exemplifying the invention in one form.

A. % weight: matrix former
B. % weight: separation inhibitor
C. % weight: particulate matter
D. viscosity at 25°C (10⁶ cps)
E. size of sample
F. % defective: separation/fill only
G. % defective: separation/fill and cracking
H. % defective: separation/fill and wire movement
I. % defective: separation/fill, wire movement and cracking
J. % defective: wire movement and cracking
K. % defective: cracking only
L. % defective: wire at surface only
M. % without defects Examples 63 through 86 of the above Table II represent formulations that were actually mixed and used in the pressure molding of stators of the type shown in FIG. 11 of the drawings. These particular types of articles are described in more detail in U.S. Pat. No. 3,762,847 and were made with a single cavity press as disclosed in that application.

The articles made from the compositions of Examples 63 through 86 were formed with apparatus as disclosed in U.S. Pat. No. 3,762,847 with the mold temperature held at about 400°F to 410°F, an air line or mold injection cylinder pressure of about 130 to 120 pounds per square inch, and a cure time of about 90 seconds before mold pressure release and stator removal; these parameters could be varied, however, apparatus other than the apparatus disclosed in said U.S. Pat. No. 3,762,847 can be used. Accordingly, it is to be understood that this description is made only be way of example.

The number of stators produced from each of the exemplary formulations is listed in Table II in the column identified as "size of sample", and the viscosity, as determined at 25°C, is also presented.

For each of the Example 63–86 formulations, 100 parts by weight of the matrix former included about 1.0 (one) part by weight catalyst (tertiary-butyl perbenzoate from Meyer Material, Inc. of Indianapolis, Indiana); about 0.6 (six-tenths) part by weight mold release agent ("Zelec" mold release from E. I. du Pont de Nemours & Co.); about 54.12 parts by weight polyester (Conchemco 519-C-111); and about 44.28 parts by weight styrene (Hoosier Solvents and Chemical D5D50B).

The percent by weight of matrix former, separation inhibitor, and particulate material for each exemplary formulation are listed in Table I. The particulate material for each example was Wolf River sand, processed as described hereinabove, and the separation inhibitor for each of Examples 63 through 86 was M-5 CAB-O-SIL.

Although it can be gleaned from the above that the ratio of polyester/styrene material for all examples was held substantially constant at roughly a 55 to 45 ratio, the ratio of materials in the matrix former may be varied.

METHODS OF BLENDING

All of the compositions of Examples 63–86 were blended by the following procedures, making use of a three speed, ten quart Hobart model C-100 mixer from the Hobart Manufacturing Co. of Troy, Ohio and a variable speed double arm Readco National Board No. 682 mixer (from the Read Corp., York, Pennsylvania).

Initially, the materials for the matrix former (including optional ingredients) were added to the Hobart mixer and mixed for 10 minutes at speed number 1. At the end of the 10 minute low speed mix, the material remaining on the side of the mixing chamber was manually mixed into the remainder of the batch with a spatula. Then the separation inhibitor was added to the mixing chamber, and the mixer blade was turned manually until the inhibitor was wet. Thereafter, the mixer was operated at speed number 2 for 10 minutes to blend together the materials in the mixing chamber and form a matrix forming mixture.

Next, the blended matrix forming mixture was transferred to the double arm mixer, the mixer was started at a speed of 24 r.p.m. and the particulate material was slowly added to the mixing container. When all of the particulate material was added, the mixer was operated for 10 minutes at 24 r.p.m. The blended pressure molding composition was then used to form stators as described above.

Although the above described process was used to fabricate the compositions identified as Examples 63–86, another suitable process instruction is as follows, wherein only the Readco Double Arm Mixer is used.

First, pour the polyester into the mixer from a beaker glass; place the styrene, catalyst, and mold release agent in the beaker glass and then pour about half the beaker mixture into the mixer. With a spatula, stir the remaining material in the beaker so as to thoroughly mix all of the polyester that is adhering to the beaker sidewalls; and then empty the beaker into the mixer.

Thereafter, tighten a lid on the mixer and mix for 10 minutes at 84 r.p.m., stop and open the mixer, and then add the separation inhibitor to the mixer. Again secure the mixer lid, mix for 3 minutes, at 24 r.p.m. to "wet" the inhibitor, and continue to mix for 10 more minutes at 84 r.p.m. to thoroughly blend the matrix forming mixture.

At this time, stop and open the mixer, add the particulate material, close the mixer and mix for 10 minutes at 24 r.p.m. to attain a blended pressure molding composition which may then be pressure molded as described above.

Now referring again to the Table II examples, each of the molding compositions of Examples 63 through 86 were used to successfully mold stators, i.e., core, coil, and housing assemblies for a dynamoelectric machine. However, all of the exemplary compositions resulted in at least some articles that were considered defective for one or more reasons. The determination of less than fully satisfactory articles (referred to as defective although many of such articles would in fact have been useable and marketable), was made by visually inspecting each pressure molded assembly for evidence of the degree of fill of the mold cavity during fabrication, separation of constituents while under pressure, surface cracking, and movement of wires during fabrication.

From observations, it is thought that the cause of incomplete mold cavity filling, i.e., "lack of fill" is related to separation of molding composition constituents during filling. In fact, in some cases where lack of fill was quite apparent, portions of hardened matrix former with no particulate material therein were readily observable. For this reason, articles exhibiting evidence of either "separation" or "lack of fill" were grouped together and the percent of each batch that such group constituted are recorded in Table II.

Other columns in the table show the percent of each sample batch rejected because of observations of lack of fill or separation, and cracking; lack of fill or separation, and wire movement, lack of fill or separation, cracking, and wire movement; wire movement and cracking; cracking only; and wire movement only.

"Cracking" of articles was determined by inspecting each article for surface crazes or cracks, while the phenomena of "wire movement" was detected by looking for the presence of wire on or at the external surfaces of the article.

The data given in Table II with regard to the percent rejected for each of the above reasons and the percent accepted are illustrated in FIGS. 1 through 8. It is believed that the better general conclusion to be drawn from this data is that preferred molding compositions, when made as described above, and when made to have a high rather than low content of particulate material, comprise from about 27 by weight to about 33 percent by weight matrix forming mixture with a ratio by weight of separation inhibitor to matrix former of from about 0.05 to about 0.10 and, preferably from about 0.06 to 0.09.

As earlier mentioned, the data of Table II has been used to plot the curves of FIGS. 1-8. More specifically, FIG. 1 is a plot of the percent of stators without observable defects that were made from the Table II compositions versus the percent by weight of matrix former in the Example 63-86 compositions for different ratios (by weight) of separation inhibitor to matrix former.

For ease of reviewing the curves of FIGS. 1-8, the curves of FIGS. 1, 3, 5, and 7 have been identified for various values of $R_2$, with $R_2$ being defined as the weight ratio of inhibitor to matrix former.

The curves of FIGS. 2, 4, 6, and 8 on the other hand have been identified for various values of $R_1$ where $R_1$ is defined as the weight ratio of matrix former to the total weight of molding composition. Accordingly, $R_1 \times 100$ is the percent by weight of matrix former in a batch of molding composition and $R_2 \times 100$ would be an expression of the amount of inhibitor as a percent of the matrix former.

Figure 3:
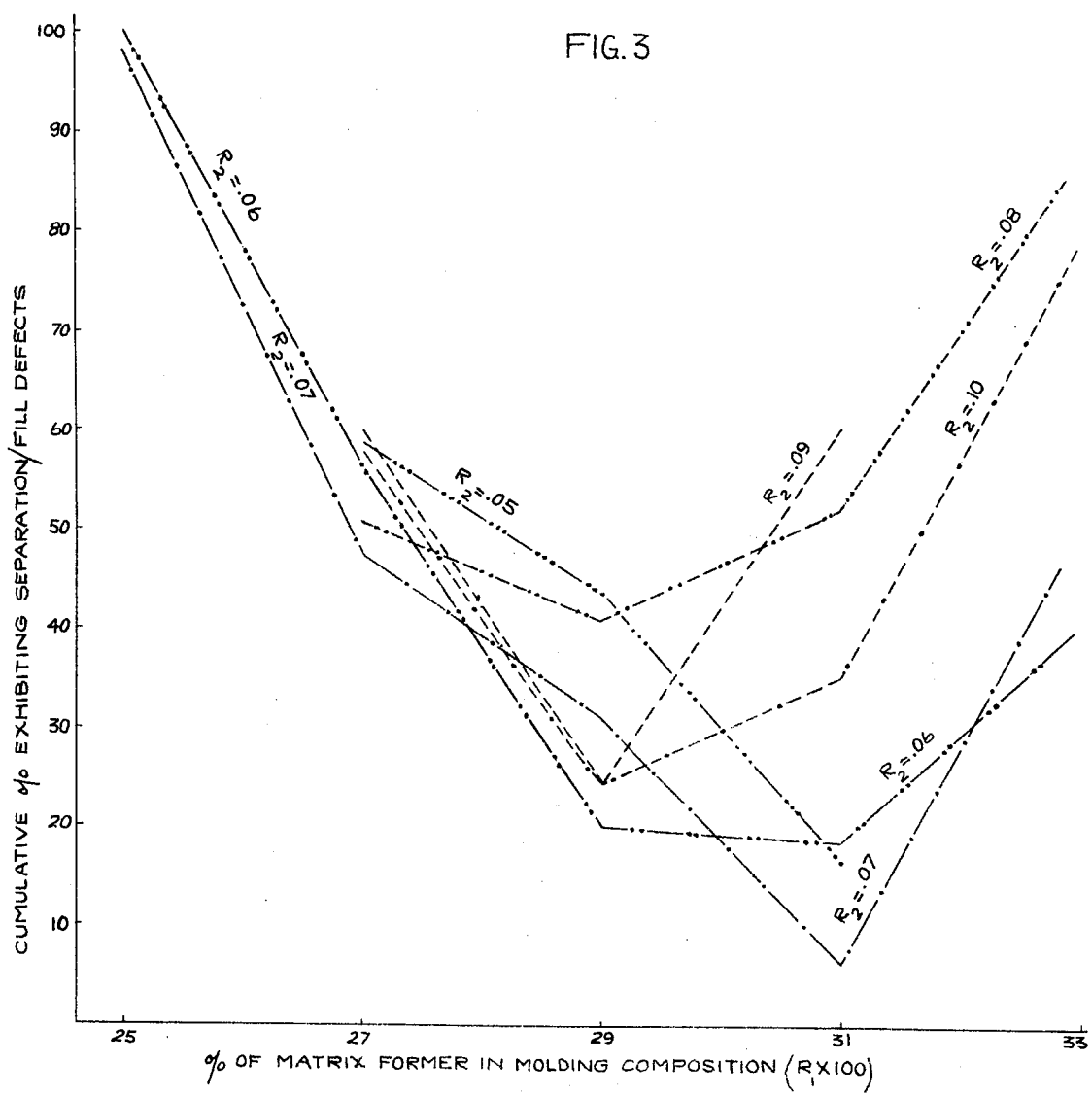
Figure 4:
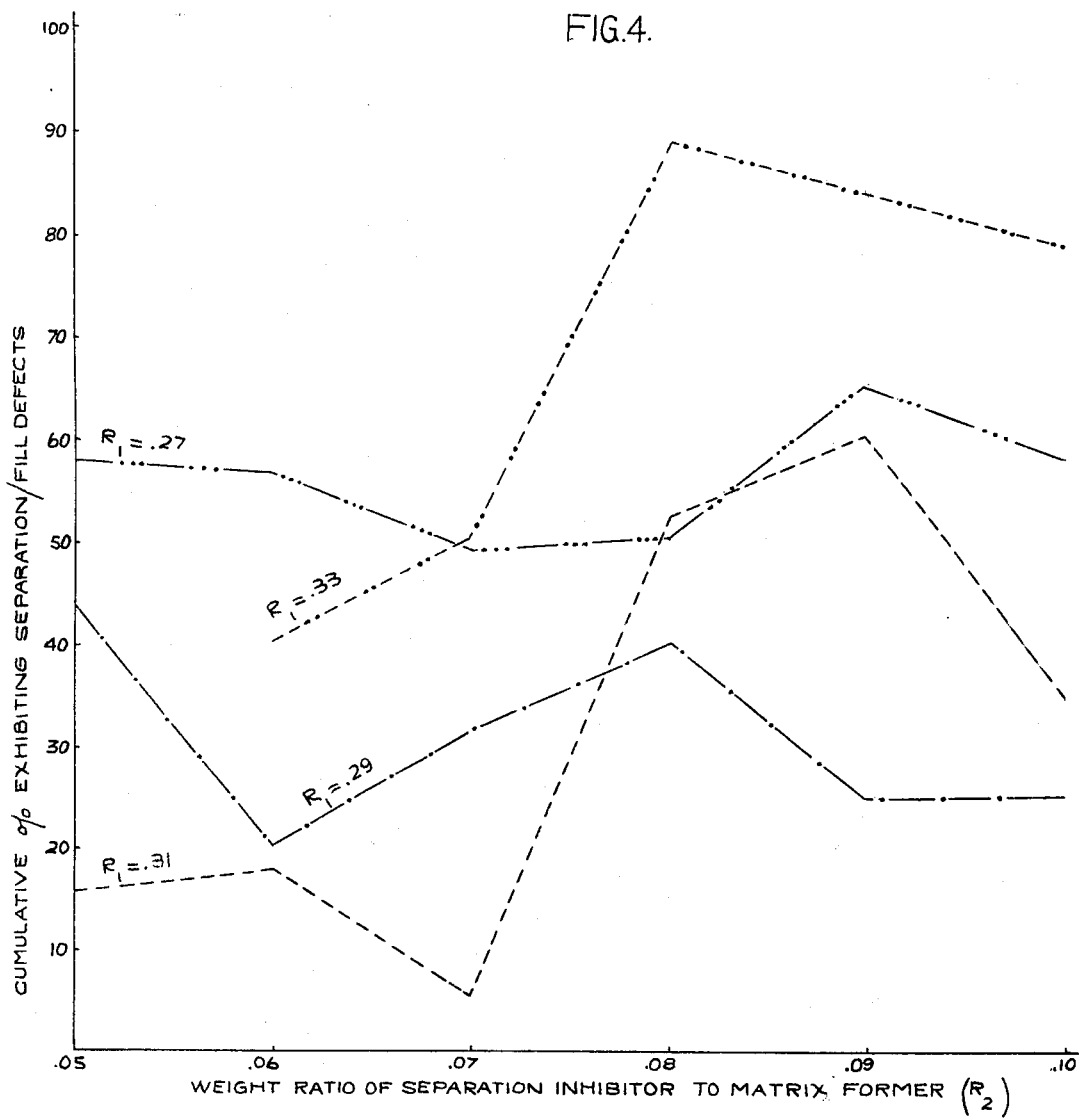

Finally, the curves of FIGS. 3 and 4 correlate the cumulative percent of all stators observed to have separation/fill defects, including those having defects of other types, with different values of $R_1$ and $R_2$; whereas FIGS. 5-8 correlate the cumulative percent of stators having observable defects due to cracking or wire movement with different values of $R_1$ and $R_2$.

It should be noted that variables other than $R_1$ and $R_2$ have been found to influence the number of acceptable stators. For example, it has been found that preheating stator cores prior to placing them in a mold cavity can reduce the occurrence of defects due to cracking. Similarly, increasing mold venting can reduce the incidence of "lack of fill/separation" and the use of stator cores with varnish treated windings can reduce the incidence of "wire movement" defects.

To compare the amount of these reductions, a second batch of stators were made from compositions generally corresponding to twelve selected ones of Examples 63-86. These Examples were numbered 87-98. However, prior to using these batches of material, the vent area of the mold cavity was increased, the windings on the stator cores were varnish treated and cured prior to the pressure molding operation, and the stator core and windings were preheated to about 140°C prior to being placed in the mold.

The percent of acceptable stators resulting from these later trials are presented in Table III below which shows percent of acceptable stators for different values of $R_1$ and $R_2$, for composition Examples 87-98. For purposes of comparison, Table III also presents the percent of acceptable stators that were made from selected ones of the Example 63-86 compositions having the tubular values of $R_1$ and $R_2$. The ratios $R_1$ and $R_2$ for all of the exemplary compositions are as defined above. It will be noted that the values of $R_1$ and $R_2$ for Examples 87-98 are not exactly equal to the ratios $R_1$ and $R_2$ for corresponding ones of Examples 68-86. The reason for this is that each of Examples 87-98 were made in 10,087 gram batches with 87 grams of each batch comprising a pigment (i.e., an optional ingredient) as part of the matrix former. Thus, a composition with a nominal ratio $R_1$ of 2700/10000 in fact would have a ratio $R_1$ of 2787/10087 or about 0.276.

TABLE III

| Example | $R_1$ | $R_2$ | % Accepted | Example | $R_1$ | $R_2$ | % Accepted |
|---|---|---|---|---|---|---|---|
| 87 | .276 | .049 | 60 | 74 | .27 | .05 | 14 |
| 88 | .276 | .058 | 80 | 68 | .27 | .06 | 17 |
| 89 | .276 | .068 | 90 | 64 | .27 | .07 | 30 |
| 90 | .276 | .075 | 85 | 80 | .27 | .08 | 14 |
| 91 | .296 | .049 | 65 | 73 | .29 | .05 | 32 |
| 92 | .296 | .058 | 40 | 69 | .29 | .06 | 30 |
| 93 | .296 | .068 | 85 | 63 | .29 | .07 | 34 |

TABLE III—Continued

| Example | $R_1$ | $R_2$ | % Accepted | Example | $R_1$ | $R_2$ | % Accepted |
|---|---|---|---|---|---|---|---|
| 94 | .296 | .078 | 65 | 75 | .29 | .08 | 19 |
| 95 | .316 | .049 | 60 | 79 | .31 | .05 | 30 |
| 96 | .316 | .058 | 60 | 71 | .31 | .06 | 35 |
| 97 | .316 | .068 | 75 | 65 | .31 | .07 | 60 |
| 98 | .316 | .078 | 65 | 78 | .31 | .08 | 24 |

The data of Table III has been presented to indicate that the subjectively determined (e.g., by visual inspection) level of acceptance of articles made from a procedure embodying the invention in one form is dependent on both the specific process and specific equipment utilized to fabricate such articles. However, it is believed that all of the foregoing disclosure is of assistance in the practice of the invention.

TEST FOR SEPARATION CHARACTERISTICS

A comparison of still another specific exemplary composition embodying the invention in one form, identified as Example 99; and a composition not suitable to the invention, identified as Example 100 was made. This comparison will be described in conjunction with FIGS. 9 and 10 of the drawings.

Figure 9:
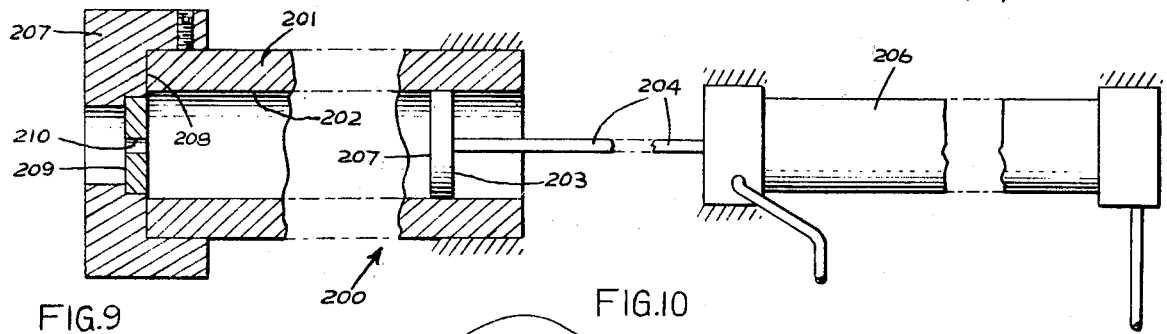
FIG. 9 is a somewhat schematic side elevation, with parts in section and parts broken away, illustrating test apparatus utilized to compare the tendency of different composition constituents to separate under a prescribed test condition.
Figure 10:
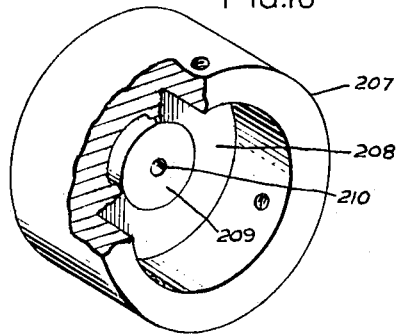
FIG. 10 is a perspective view of part of the apparatus of FIG. 9.
Figure 5:
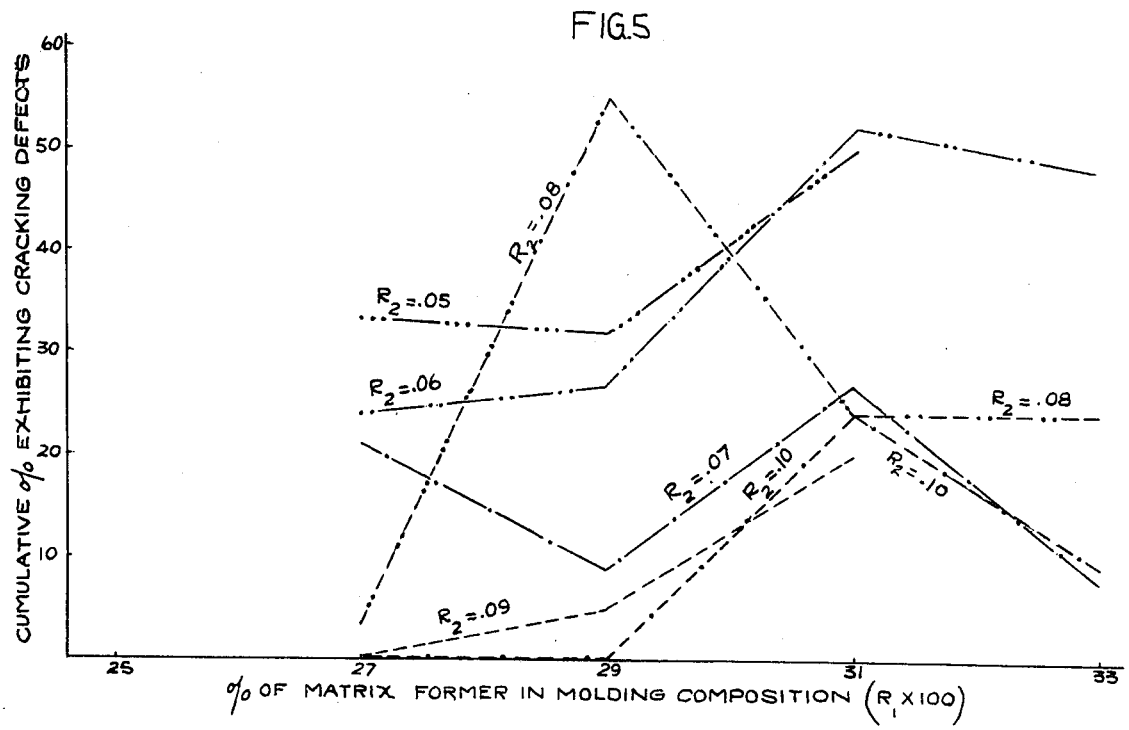
Figure 6:
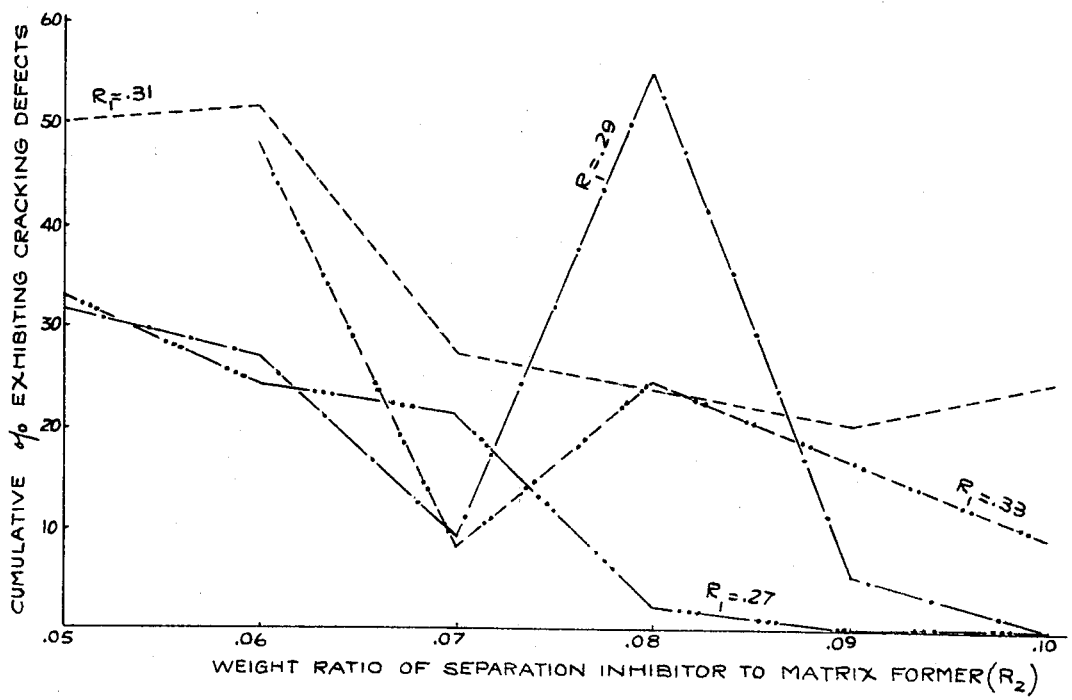

A test arrangement, similar to the arrangement shown in FIG. 9 was used to determine the relative tendency of components in each of the two compositions to separate when a cylinder of each of the compositions was subjected to a pressure differential so as to extrude the composition through drilled orifices of various sizes. The content and formulation procedure for the two compositions was as follows:

Example 99

| Material | Weight (gms) | Percent (%) By Weight |
|---|---|---|
| Styrene | 642.0 | 12.74 |
| Pigment | 43.5 | .86 |
| Mold Release | 8.5 | .17 |
| Catalyst | 14.5 | .29 |
| Polyester | 784.5 | 15.58 |
| Sub Total | 1493.0 | 29.64 |
| Separation Inhibitor | 101.5 | 2.01 |
| Particulate Material | 3449.0 | 68.35 |
| TOTAL | 5043.5 | 100.00 |

The ratio $R_1$ for the Example 99 material was about 0.296 and the ratio $R_2$ was about 0.68. The composition of Example 99 was mixed using the Hobart mixer only since the capacity of a 10 (ten) quart Hobart mixer container is sufficient to hold a 5000 gram batch of Example 99 and 100 material. The order of mixing was as described above, and actual blending was accomplished by 10 minute mixing intervals at speed number 2 after each ingredient addition. In the composition of Example 99, the "pigment" selected was in fact a black tinting agent sold by Conchemco as No. KA3. In addition Zelec mold release; tertiary butyl perbenzoate catalyst; CAB-O-SIL M-5silica separation inhibitor; and Wolf River sand particulate material were used.

EXAMPLE 100

The material content of Example 100 differed from the material content of Example 99 only in that no separation inhibitor and no tinting agent was used. Otherwise, the same materials and weights of materials were used. In addition, the mixing procedure was the same for Example 100 as Example 99 except that all mixing procedures relating to separation inhibitors were, of course, omitted. The tinting agent was omitted in order to make it easier to detect the occurrence of separation of materials and, since the tinting agent would have comprised only about 0.8 percent by weight or 0.9 percent by volume of the mixture, the omission thereof was insignificant with respect to the results obtained.

One initial observation made while mixing Example 100 was that every time the mixer was stopped after particulate material had been added, a clear layer of liquid matrix former was immediately observable on the top of the particulate material mass. This occurred even after all of the particulate material was added and the mixer was operated for as much as an additional 25 minutes. Thus, even at the mixing stage, it became apparent that the Example 99 material appeared to be a permanently blended composition whereas the Example 100 material was a readily separable mixture. To further compare the flowability and blended characteristics, i.e., tendency to separate, a test utilizing equipment as shown in FIG. 9 was used.

With reference to FIG. 9, the equipment 200 included a steel cylinder 201 having an internal diameter of about 1 5/8 inches. The wall thickness of the cylinder 201 was about ½ inch. Slip fitted in the bore 202 of the cylinder was a plunger 203 that in turn was secured to the rod 204 of a pneumatic cylinder 206. Cylinders 201 and 206 were both clamped with C clamps to a test bench and supported so that the plunger 203 could move freely to within one inch of the end 208 of cylinder 201 when air was supplied to the back end of the cylinder 206.

The cylinder 206 was a pneumatic cylinder manufactured by the Hydro-line Manufacturing Company of Rockford, Illinois having a 4 inch stroke and a piston area of 3.25 square inches. Although the cylinder 206 was of the type having a hydraulic section by which the speed of stroke could be controlled, all oil was purged from the hydraulic system so that the cylinder 206 operated as a simple pneumatic cylinder. A source of shop air was connected through a conventional two-way valve so as to be able to selectively apply shop air at about 100 pounds per square inch (gauge pressure) to the cylinder. Since the cylinder was used as an uncontrolled air cylinder it has been schematically depicted as such in FIG. 9.

The end cap 207 was designed to slip fit over the outer diameter of the cylinder 201 and be secured thereto by three sets screws. In addition, a plurality of orifice plates 209 were used with the orifice plates comprising a ½ inch thick disc with an orifice drilled through the center thereof so that, after assembly of the test apparatus, the center of the orifice would be centered with the center line of the plunger 207. The orifices were made by using drills of standard sizes and the edges of the orifices were not broken. Different discs having orifices of ⅛ of an inch, 5/32 of an inch, 3/16 of an inch, and 7/32 of an inch were used.

It was found that, with the test cylinders clamped to a horizontal bench surface (where the plunger 207 could operate along a substantially horizontal line), the plunger 207 traveled a full four inch stroke and the material of Example 99 was ejected from each of the orifices. Also, no evidence of separation of constituents within the Example 99 mixture was observed. In each test involving the Example 99 material, it was possible to fill the cylinder 201 in preparation for each trial by plastering the interior of the cylinder 201 with the Example 99 material, since it had the consistency of a thick doughy type material although it also appeared to crumble while being subjected to the action of the Hobart mixing arm.

On the other hand, it was not possible to fill the cylinder 201 with the Example 100 material except by unclamping the cylinders, standing them on end on the test bench, and then pouring a batch of the Example 100 material into the cylinder 201. This was because the matrix former literally tended to run out of the particulate material for the Example 100 mix. In order to avoid, to as great an extent as possible, the substantially instantaneous separation of particulate material and matrix former that was observed to be occurring, the cylinder 201 was filled with the Example 100 material by the following procedure.

The procedure was as follows. While a first man turned off the Hobart mixer and lowered the mixing bowl, a second man quickly poured an amount of the Example 100 material into a stainless steel beaker and began manually stirring, with a spatual, the Example 100 material in the beaker in an attempt to prevent the matrix former from coming to the top of the particulate material within the beaker. Then, while continuing to agitate the material in the beaker, it was poured into the cylinder 201.

Then, as the cylinder 201 was filled, the end cap 207 and selected orifice disc were placed on the cylinder and it was lowered and clamped to the test bench. Since matrix former from the Example 100 material (and some of the particulate material) started to flow out of the orifice, the orifice was manually covered while the cylinders were clamped to the test bench.

Pressure was then applied to the cylinder 206. It was then observed in each case that the rod 204 of the cylinder 206 stopped moving although some material did continue to slowly ooze out of the orifice of each orifice disc. When material substantially stopped flowing from the orifice, the air pressure was disconnected from the cylinder 206 so that the plunger 207 remained in its stopped position within the cylinder 201.

Next, the material that had been jetted out of the orifice was examined and it was observed that the material appeared to be very high in matrix former concentration.

Thereafter, the end cap 207 and orifice plate were removed from the cylinder 201, and it was observed that a very tightly packed mass of relatively dry particulate material remained in the cylinder. This material was removed from the cylinder 201 and the distance from the end of the cylinder 201 to the face of the plunger 207 was recorded. At the end of this time, air pressure was again applied to the pneumatic cylinder 206 and it was observed that the plunger 207 moved toward the end 208 of the cylinder 201. The amount of this movement was determined, by again measuring from end 208 of cylinder 201 to the fully extended position of the plunger 207. The amount of this secondary travel varied, depending on orifice size. For a 1/8 inch orifice the secondary travel was 1 3/16 inch; 1 inch travel for a 5/32 inch as well as 3/16 inch orifice; and about 7/8 of an inch for the 7/32 inch diameter orifice.

When the above test was repeated, it was found that in each case the movement of plunger 207 was arrested by a particulate mass from the Example 100 mix. On the other hand, with the same orifice plates and same test arrangement, the plunger 207 moved to its fully extended position on every trial with the Example 99 composition. All of these trials were run with the mixes at approximately room temperature, e.g., about 30°C.

From the foregoing, it is believed that it is evident that the flowability and separation characteristics of the Example 100 mixture were such that the Example 100 material would be unsuitable for use in a pressure molding process such as those of the well-known transfer or injection type. On the other hand, the Example 99 mixture has been used and resulted in consistently satisfactory results with apparatus as disclosed for example in U.S. Pat. No. 3,762,847.

Figure 12:
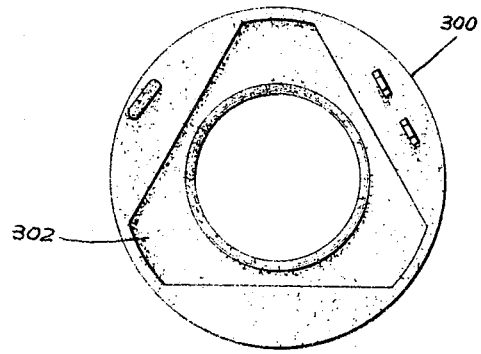
FIG. 12 is a bottom plan view of the article shown in FIG. 11.

It is believed that, as compared with materials and articles known heretofore, structures made by practicing embodiments of the present invention are characterized by, among other things, generally uniform and consistent blended material content from one portion thereof to another; whether considering a blended mixture or pressure molded article of manufacture made therefrom. Thus, different parts of articles made by practicing the invention, for example article 300 shown in FIGS. 11 and 12, would be blended agglomerate structures having substantially the same material content, structural characteristics, and physical properties, when randomly selected. It is therefore believed that the material content of a portion of the end 301 of article 300 would be substantially the same as a portion of the end 302 of the same article.

What I claim and desire to secure by letters patent of the United States is:

1. A method of manufacturing a dynamoelectric machine structure including a winding support, windings supported on the winding support, and a protective structure surrounding at least a portion of the windings, the method comprising the steps of:

positioning at least a portion of the windings in a mold cavity defining structure;

injecting a pressure molding composition under a pressure differential of at least about 40 psi into said cavity in intimate engagement with at least a portion of the windings;

said pressure molding composition comprising a blended, stable mixture of a liquid thermosetting synthetic resinous matrix forming material, an inorganic particulate material having a particle size distribution such that about 95 to 100 percent passes a 30 mesh sieve, at least about 50 percent passes a 40 mesh sieve and is retained on a 100 mesh sieve, and no more than a minor amount passes a 200 mesh sieve, and a finely divided solid particulate separation inhibitor selected from the group consisting of colloidal silica, powdered asbestos, powdered silica, and mixtures thereof, said particulate separation inhibitor having a particle size smaller than 325 mesh and at least one dimension smaller than one micron; said separation inhibitor being in an amount sufficient to prevent separation of the filler from the matrix forming material when said molding composition is injected under pressure into the mold cavity, the weight ratio of matrix forming material to the total weight of the composition being between about 0.27 and about 0.33; the weight ratio of inhibitor to matrix material being between about 0.05 and about 0.10; and the weight ratio of particulate material to the total weight of the composition being between about 0.65 and about 0.75;

at least partially curing said molding composition so injected to form a rigid, nonporous, dimensionally stable, protective structure at least partially surrounding said windings and winding support; and removing the winding support, windings and protective structure from the mold cavity.

2. A method of making a dynamoelectric machine structure including a winding support, windings supported on the winding support, and a protective structure surrounding at least a portion of the windings, the method comprising the steps of:

positioning at least a portion of the windings in a mold cavity defining structure;

injecting a pressure molding composition under a pressure differential of at least about 40 psi into said cavity in intimate engagement with at least a portion of the windings;

said molding composition comprising a blended, stable mixture of a liquid thermo-setting synthetic resinous matrix forming material, an inorganic particulate material having a particle size distribution such that about 95 to 100 percent passes a 30 mesh sieve, at least about 50% passes a 40 mesh sieve and is retained on a 100 mesh sieve, and no more than a minor amount passes a 200 mesh sieve, and a finely divided solid particulate separation inhibitor selected from the group consisting of colloidal silica, powdered asbestos, powdered silica, and mixtures thereof, said inhibitor having a particle size smaller than 325 mesh and at least one dimension smaller than one micron, with the weight ratio of matrix material to the total weight of the composition being between about 0.27 and about 0.33, and the weight ratio of separation inhibitor to matrix material being between about 0.05 and about 0.10; said molding composition being adapted to be molded while subjected to a pressure differential of at least about 40 psi without separation of the particulate material from the matrix forming material;

at least partially curing said molding composition so injected to form a rigid, nonporous, dimensionally stable, protective structure at least partially surrounding said windings and winding support; and removing the winding support, windings and protective structure from the mold cavity.

3. The method of claim 2 wherein said matrix forming material comprises a mixture of styrene and a nonphthalic polyester resin formed of monobasic and polybasic acids and polyhydric alcohols.

4. The method of claim 3 wherein said matrix forming material includes a polyester and styrene mixture with a polyester to styrene ratio of about 60 parts by weight or less polyester and 40 parts by weight or more styrene.

5. The method of claim 2 wherein said molding composition includes a matrix forming material chosen from the group consisting of polyesters, combinations of polyesters and styrene, combinations of polyesters and vinyl toluene, epoxys, phenolics, polybutadienes, acrylics, combinations of epoxys and polyesters, and combinations of epoxys and acrylics.

6. The method of claim 2 wherein said particulate material is selected from the group consisting of silica sand, chromite ore, slate, chalk, zirconia, alumina, calcium carbonate, beryllium oxide, magnesium oxide, zircon sand, and combinations thereof.

7. The method defined in claim 2 wherein said particulate material is silica sand having a particle size distribution such that about 95 to 100 percent passes a 30 mesh sieve, about 57 to 80 percent passes a 50 mesh sieve, about 5 to 15 percent passes a 100 mesh sieve, and no more than about 5 percent passes a 200 mesh sieve.

8. The method defined in claim 7 wherein said particulate material comprises a subangular whole grain sand substantially free of copper compounds and metallic salts.

9. The method defined in claim 2 wherein said molding composition has a viscosity of between about $2.5 \times 10^5$ and about $61 \times 10^5$ centiposes.

10. The method defined in claim 2 wherein said separation inhibitor is colloidal silica.

11. A method of making a dynamoelectric machine structure including a winding support, windings mounted on the winding support, and a protective structure surrounding at least a portion of the winding, the method comprising the steps of:

positioning at least a portion of the windings in a mold cavity defining structure;

injecting a pressure moldable thermo-setting molding composition under a pressure differential of at least about 40 psi into the mold cavity and into intimate engagement with at least a portion of the windings; the pressure moldable thermo-setting molding composition comprising a blended, stable, mixture of a matrix material formed of a liquid thermosetting synthetic resinous type adhesive, an inorganic particulate material having a particle size distribution such that about 95 to 100 percent passes a 30 mesh sieve, at least about 50 percent passes a 40 mesh sieve and is retained on a 100 mesh sieve, and no more than a minor amount passes a 200 mesh sieve, and a finely divided inorganic separation inhibitor selected from the group consisting of colloidal silica, powdered silica, powdered asbestos and mixtures thereof, said inhibitor having at least one dimension of less than about 1 micron, the matrix material, particulate material, and separation inhibitor being inert to and compatible with the dynamoelectric machine structure and chemically unreactive with each other, the ratio of the matrix material to the blended, stable, mixture being between about 0.26 and about 0.33 percent by weight, the ratio of the separation inhibitor to the matrix material being between about 0.05 and 0.10 percent by weight, and the blended, stable, composition having a viscosity between about $2.5 \times 10^5$ and about $61 \times 10^5$ centiposes and being moldable under a pressure differential of at least about 40 psi without separation of the particulate material from the matrix material, the molded composition being curable to provide a hard, essentially nonporous, rigid, dimensionally stable, protective structure;

curing at least a portion of the molding composition adjacent the mold casting surfaces to form said protective structure; and removing the molded structure from the mold cavity.

* * * * *